(12) United States Patent
Murali

(10) Patent No.: US 8,264,526 B2
(45) Date of Patent: Sep. 11, 2012

(54) METHOD FOR FRONT MATCHING STEREO VISION

(75) Inventor: Beddhu Murali, Petal, MS (US)

(73) Assignee: The University of Southern Mississippi, Hattiesburg, MS (US)

( * ) Notice: Subject to any disclaimer, the term of this patent is extended or adjusted under 35 U.S.C. 154(b) by 601 days.

(21) Appl. No.: 12/459,196

(22) Filed: Jun. 26, 2009

(65) Prior Publication Data

US 2010/0007720 A1 Jan. 14, 2010

Related U.S. Application Data

(60) Provisional application No. 61/076,445, filed on Jun. 27, 2008.

(51) Int. Cl.
*H04N 15/00* (2006.01)
*H04N 13/02* (2006.01)
(52) U.S. Cl. .......................................................... 348/47
(58) Field of Classification Search ...................... 348/47
See application file for complete search history.

(56) References Cited

U.S. PATENT DOCUMENTS 5,836,872 A * 11/1998 Kenet et al. .................... 600/306
5,867,591 A * 2/1999 Onda ............................. 382/154

OTHER PUBLICATIONS

Ohta, Yuichi; Kanade, Takeo; , "Stereo by Intra- and Inter-Scanline Search Using Dynamic Programming," Pattern Analysis and Machine Intelligence, IEEE Transactions on , vol. PAMI-7, No. 2, pp. 139-154, Mar. 1985.*
Baker, Henry Harlyn; "Depth from Edge and Intensity Based Stereo"; Sep. 1982; Stanford Univ. Dept. of Computer Science available at http://oai.dtic.mil/oai/oai?verb=getRecord&metadataPrefix=html &identifier=ADA126745.*
Sherman, D.; Peleg, S.; , "Stereo by incremental matching of contours," Pattern Analysis and Machine Intelligence, IEEE Transactions on , vol. 12, No. 11, pp. 1102-1106, Nov. 1990 doi: 10.1109/34.61711.*
Malladi, R.; Sethian, J.A.; , "Level set and fast marching methods in image processing and computer vision," Image Processing, 1996. Proceedings., International Conference on , vol. 1, no., pp. 489-492 vol. 1, Sep. 16-19, 1996 doi: 10.1109/ICIP.1996.559540.*
Lowe, D.G.; , "Object recognition from local scale-invariant features," Computer Vision, 1999. The Proceedings of the Seventh IEEE International Conference on , vol. 2, no., pp. 1150-1157 vol. 2, 1999 doi: 10.1109/ICCV.1999.790410 URL: http://ieeexplore.ieee.org/stamp/stamp.jsp?tp=&arnumber=790410&isnumber=17141.*
Tuytelaars, T. and Van Gool, L. 2000 "Wide baseline stereo based on local, affinely invariant regions" In British Machine Vision Conference, Bristol, UK, pp. 412-422.*

* cited by examiner

*Primary Examiner* — Mehrdad Dastouri
*Assistant Examiner* — Jeremaiah Hallenbeck-Huber
(74) *Attorney, Agent, or Firm* — Lawrence Arthur Schemmel

(57) ABSTRACT

The present invention provides a method, system, and apparatus for solving the stereo vision matching problem. The invention implements a method for solving image correspondence problems so that each front region between consecutive extremal pixels in one image is matched to a corresponding front region between consecutive extremal pixels in another image.

31 Claims, 6 Drawing Sheets

Left image

Right image

METHOD FOR FRONT MATCHING STEREO VISION

CROSS-REFERENCE TO RELATED APPLICATION

This application claims priority from U.S. Provisional Patent Application Ser. No. 61/076,445 filed Jun. 27, 2008. The entirety of that provisional application is incorporated herein by reference.

FIELD OF THE INVENTION

The present invention relates to a method, system, and apparatus for solving the stereo vision matching problem. The invention provides feature-front based stereo matching image processing for technologies including computer and/or machine vision; robotics; target recognition; autonomous navigation; and telescope, periscope, and camera design. The method and system of this invention can also be used in applications involving self-navigating drones and/or vehicles.

BACKGROUND OF THE INVENTION

The correspondence problem in stereo vision has been a well-studied problem for the past several decades. While great progress has been made over the years and especially in the past decade or so, there is room for further improvement. Impressive results have been reported in recent years for the sub-class of problems that involves only or predominantly fronto-parallel surfaces. A current snapshot of the state-of-the-art in stereo vision algorithms can be found at the popular Middlebury web site. However, the general class of problems involving arbitrary surfaces at arbitrary orientations is still difficult to solve. Lighting changes and other environmental factors also complicate the problem.

The earliest and the most straight-forward techniques for stereo matching are the window-based techniques, where a small window is held fixed around a pixel in one image and is moved along the corresponding epipolar line in the other image to find the corresponding pixel according to some matching criterion. The simplest of the matching criteria available in the literature is to minimize the sum of the absolute intensity differences (SAD) between the two windows. Such window-based matching approaches have been shown to produce noisy results. This is due to several factors such as: (1) the affine nature of the motion in the image plane, (2) existence of depth discontinuities in the scene, (3) occurrences of occlusions and disocclusions, (4) specular reflections, and (5) sensor noise. One idea suggested in the literature to alleviate the noise issue is to use variably-sized windows for different pixels. This idea, however, leads to the question of how to choose the correct window size for a given pixel for general scenes. This issue has not been satisfactorily resolved.

Recent approaches such as graph cuts and belief propagation are (or can be) cast without windows (in their data term) and instead invoke the Markovian assumption and consider the disparity field as a Markov random field with usually first order cliques for simplicity. Then, this field is modeled with a data term and a smoothness term and the data term is modeled with a pixel-based SAD-score, for example, and the smoothness term is modeled with usually the Potts model and clever optimization strategies are devised to solve the resultant minimization problem. Pixel-based SAD score is noisy and so robust distance metrics such as truncated distance metrics are introduced. Truncating this distance metric is an art. Also, for a given pixel on the left image, the number of pixels on the right image to be searched for a match is a user-specified parameter, whose design is an art. These schemes typically take a large amount of wall-clock compute time to produce a disparity map for a typical-sized image. These approaches produce less satisfactory results for scenes involving non fronto-parallel surfaces. The reason for this behavior might be due to the smoothness term used since the data term comes from actual data. Specifically, smoothness terms currently used might be over-constraining the disparity field in the vertical direction for non fronto-parallel scenes.

The level set method was introduced by Osher and Sethian to solve front propagation problems. They designed the so-called numerical fluxes for the level set equation by applying ideas originally developed for hyperbolic conservation law solvers. Their design of the numerical flux implies that shock waves and expansion waves occur only at the local extrema of the level set function. Shock waves and expansion waves correspond to discontinuities in the speed function that appear in the level set equation. Shock waves and expansion waves occur in several hyperbolic flow situations. In traffic flow for example, when a slow moving vehicle is approached by fast moving vehicles a shock wave develops, and when fast moving vehicles leave (or pass) a slow moving vehicle an expansion wave develops. In optical flow and stereo vision, occlusion and disocclusion correspond to shock waves and expansion waves, respectively. In the level set method, the level set function is typically initialized to be the signed distance from the initial front and the propagation of this front over time with a known speed function is what is of interest. The theory behind the level set method is not, however, restricted to the signed distance function.

Both optical flow and stereo vision problems can be characterized as inverse problems since one's objective is to find the optical flow velocity vector or the disparity map given two images. In this work, the stereo vision problem is interpreted as a 1-D optical flow problem. Though this interpretation was used earlier in Scheuing and Niemann, the present invention and algorithm is completely different from their methodology.

By considering the image intensity field as the level set function, one can apply the theoretical framework of the level set method to solving optical flow and stereo vision problems. For example, according to the level set method, discontinuities in depth can occur only at the extrema of the image intensity field. This is because the speed function in the level set method can be expressed in terms of optical flow velocity or disparity in the case of stereo vision and it is well-known that both optical flow velocity and disparity can be expressed in terms of depth. In other words, the level set method guarantees that the speed function (and thereby depth) is smooth away from the extrema of the level set function. Thus, for stereo vision, if one knows the disparity at two consecutive extrema of the image intensity field along an epipolar line, then one can obtain the disparity values at in-between pixels using interpolation since they vary smoothly at these pixels.

The earliest works that are conceptually similar to the present approach are that of Marr and Poggio, Baker and Binford, and Ohta and Kanade. These approaches are categorized as primitive matching approaches in the literature. The key ideas in these works are (1) find primitives (usually edges) in both left and right images, and (2) match edges. Both Marr and Poggio and Baker and Binford use the zero-crossings of the second derivative of the image intensity field and use fixed size windows to match the pixel locations of the edges along scanlines. Ohta and Kanade use the peaks and valleys of the first derivative of the image intensity field and use a matching cost defined in terms of the variance of the combined set of image intensity values from both intervals in the left and right scanlines between pairs of edges under consideration. The Ohta and Kanade approach is an interval matching technique. Since the matched intervals need not be of the same length, they must define the matching cost using the variance.

Marr and Poggio also suggest the use of interpolation to fill in the disparity values at in-between pixels once the disparities have been computed at the edges. However, interpolation is done only in the image where the "hidden" discontinuity is actually hidden, which means what is visible varies smoothly. In terms of the level set terminology, if the motion is from left to right and the discontinuity is hidden in the left image then this corresponds to an expansion wave and interpolation is permissible in such regions. Marr and Poggio had the correct insight and the correct physical argument about a decade before the level set method was introduced. However, the level set method uses the extrema of the gradient of the image intensity field which are typically found using the product of forward and backward difference operators.

Lowe developed the SIFT (Scale Invariant Feature Transform) approach for detecting features that are persistent across image transforms. He first identifies strict local extrema in scale space and then encodes the image region around such extrema into a high-dimensional feature vector. He then uses a variation of the k-d tree algorithm called best-bin-search method to determine the nearest neighbors in the feature space in order to match key-points across two images. The present approach is conceptually and algorithmically simpler and computationally much faster than Lowe's method. Also, the present method is about computing dense disparity fields.

Tuytelaars and Van Gool identify regions around local image intensity extrema and encode these regions into a feature vector. Then they use these feature vectors along with other feature vectors identified with other criteria such as corner detectors in an opportunistic manner to find matches across images. They use nearest neighbor with respect to the Mahalanobis-distance in the feature space as the criterion for establishing matches. They apply this approach for wide-baseline stereo and show coarse correspondences between image regions.

As discussed, Ohta and Kanade and Marr and Poggio use different aspects that are consistent with the level set method. However, in order to find image intensity extrema, Ohta and Kanade use several central difference operators with different sizes and combine their results giving priority to the smaller-sized operators. Since smaller-sized operators result in better edge localization, they adapt this strategy. They include the edges detected by the larger-sized operators if the smaller ones don't find any edge within the stencil of the larger operator. They also neglect extrema where the absolute value of the image intensity gradient is below a threshold value.

Based on the prior art, there exists a need for a method for simple, accurate, efficient, and fast front feature matching stereo vision image processing. The present invention provides such a method and system.

SUMMARY OF THE INVENTION

It is an object of the present invention to provide a method, system, and apparatus utilizing a computer-based device for solving the stereo vision matching problem. Another object and a further advantage of the present invention is that it provides a method and apparatus for matching each front region between consecutive extremal pixels in one camera image to a corresponding front region between consecutive extremal pixels in another camera image.

With the foregoing and other objects, features, and advantages of the present invention that will become apparent, the nature of the invention may be more clearly understood by reference to the following detailed description of the invention and to the appended claims.

BRIEF DESCRIPTION OF THE DRAWINGS

These drawings accompany the detailed description of the invention and are intended to illustrate further the invention and its advantages.

DETAILED DESCRIPTION OF THE INVENTION

The present invention is directed to a novel method, system, and apparatus for stereo vision matching using min-max sum of the absolute intensity differences (SAD) and feature fronts. The invention in a preferred embodiment addresses the problem of stereo vision matching and implements, utilizing a computer-based device, front feature matching stereo vision image processing. It will be understood by those skilled in the art that the present invention is not limited in its application to the details of the arrangements described herein since it is capable of other embodiments and modifications. Moreover, the terminology used herein is for the purpose of such description and not of limitation. The present invention described via the detailed description herein is not to be considered limiting in scope.

The invention provides a novel algorithm inspired by the level set method for solving the stereo matching problem. Stereo matching is considered a 1-D level set front propagation problem. The present invention utilizes feature fronts and the resulting min-max SAD score. Each front is assigned a feature strength and matching is done in the descending order of feature strengths. Left-right consistency, ordering constraint, and uniqueness are also imposed in different ways than usual. Occlusion is not explicitly tracked during the process of matching in the current implementation. It is assumed that unmatched fronts would imply occlusion or disocclusion as the case may be. The invention also shows that smoothness in the disparity map can be obtained without explicitly imposing smoothness.

To be fully consistent with the level set method, the present invention uses the extrema of the image intensity field obtained by using the product of the forward and backward differences of the image intensity field. Since only a sign change is needed, first order differences are sufficient. If this product is zero or negative at a pixel, then that pixel qualifies as an extremal pixel. If this product is zero, then one of the differences must be non-zero. Before using the finite difference operators, an input image is smoothed using a filter, such as a Gaussian filter.

Figure 1:
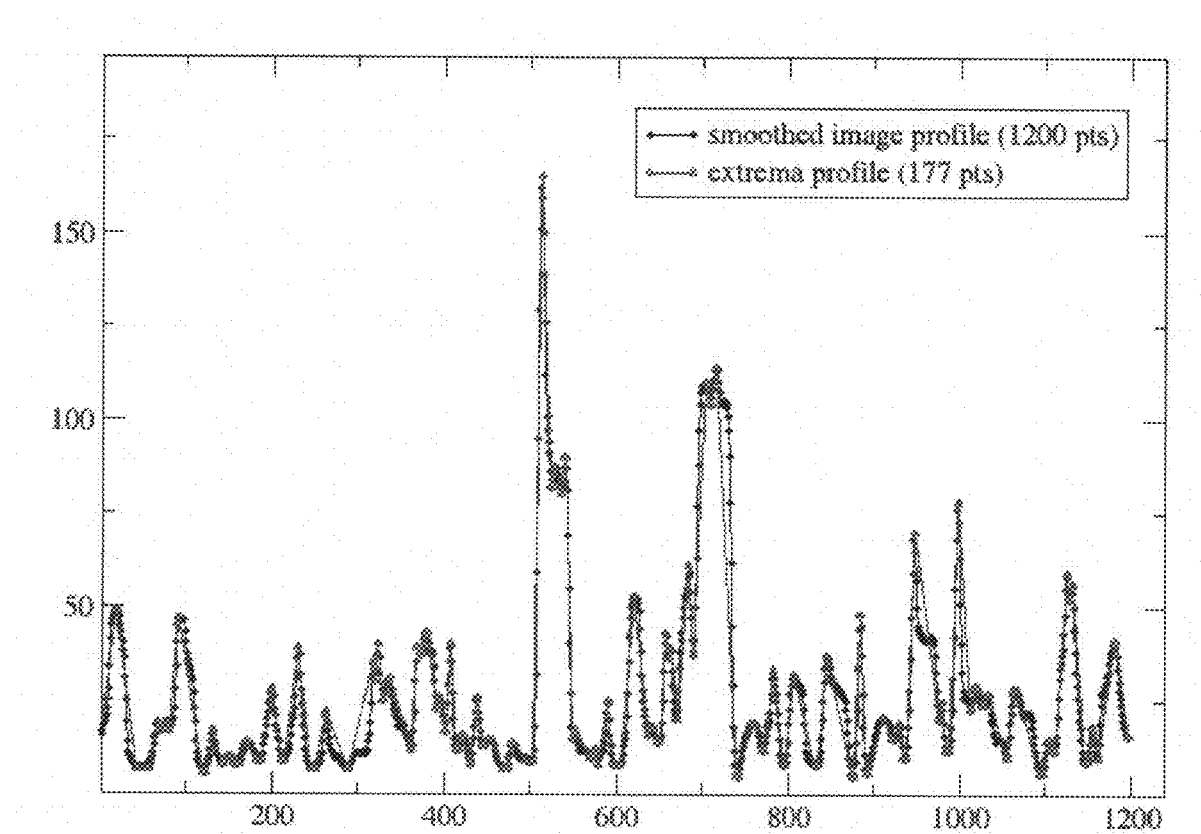
FIG. 1 is a graphical illustration of the extremal profile that closely matches the smoothed image profile.

For the present invention, the region between consecutive extrema is called a feature front. In general, different feature fronts will have different widths. Since in-between pixels play no role in determining the disparity values at the extremum pixels at either ends of a front, one can replace the actual front by a straight line connecting the extremal values. Thus, a given extremal pixel would belong to two fronts, one ahead of the extremal pixel and one behind the extremal pixel. FIG. 1 shows a comparison between a smoothed intensity profile and the extremal profile obtained by connecting the extremal values by straight lines. In FIG. 1, the x-axis represents the number of pixels and the y-axis represents intensity. The agreement is quite good since the extremal profile closely matches the smoothed image profile.

After the scanline is segmented into several feature fronts, the next task is to assign them strengths. The strength of a feature front is defined as the absolute difference of its extremal intensity values. This allows one to order feature fronts based on their strengths. To account for quantization errors, fronts whose strengths are zero or one are not considered in the matching process. This approach is quite different from that of Ohta and Kanade, who neglect extremal points whose absolute intensity gradient is below a threshold value. Front strengths are gross features that can span several pixels, whereas intensity gradient is restricted to a smaller stencil in the neighborhood of a pixel.

Since, fronts need not be of the same size, one approach to define a matching cost is to define it using a variance measure. However, since only extremal pixels play a role in determining the disparities at extremal pixels, the matching cost used in the present invention is the SAD score of the extremal pixels. This two-point SAD score is called min-max SAD in the present invention.

In order to find disparities and occlusions along an entire scanline, Ohta and Kanade use dynamic programming to impose smoothness across scanlines. In contrast, the present invention uses a different strategy as described herein.

The invention matches fronts based on their strengths. Thus, the strongest front is matched first and the weakest front is matched last. There are several advantages to this approach. First, in order to match the strongest front the entire scanline is scanned. Thus, there is no need to limit a priori the number of pixels to search for, as is traditionally done. Second, because of the uniqueness constraint, matches found for stronger fronts serve as bounds for the search range for weaker fronts. However, this must be done carefully as discussed later.

In traditional approaches, the left right consistency is imposed after first finding all the left and right disparities of the entire scanline. One can call this approach as a loosely coupled approach for left-right consistency. In the present invention, left-right consistency is imposed in a tightly-coupled or incremental fashion. Thus, for instance, after finding a match in the right image for a front in the left image, a search for a match for this front in the right image is immediately performed. Only when this search results in the original front in the left image is the match accepted. Otherwise, it is rejected. This is a third advantage of the present approach.

While the uniqueness constraint and left-right consistency are imposed in a tightly-coupled manner, the ordering constraint is not imposed similarly. This accounts for the possibility that a match for a stronger front can still be incorrect. Thus, ordering is imposed as a post-processing step after all the matches have been found.

Figure 2:
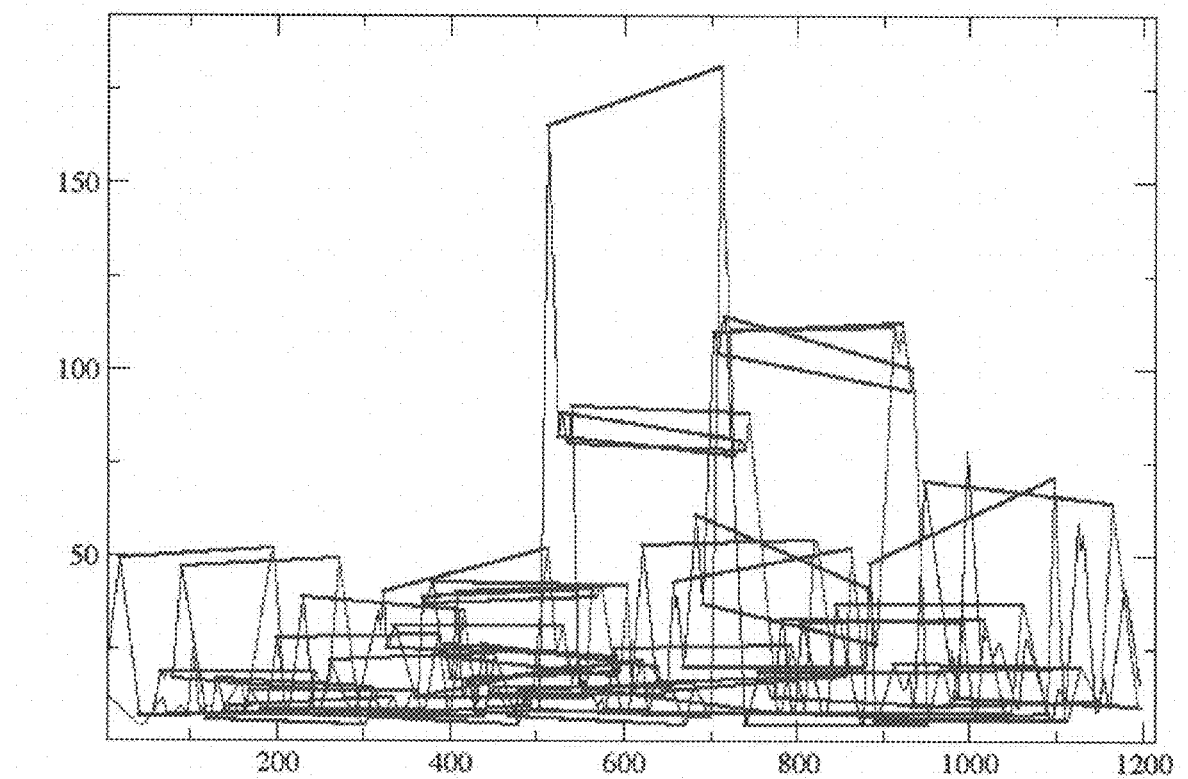
FIG. 2 is a graphical illustration of a 1D matching result using the present invention showing image profiles from actual aerial photographs.

A 1D matching result using the method and apparatus of the present invention is shown in FIG. 2, where the x-axis represents the number of pixels and the y-axis represents intensity. The image profiles came from actual aerial photographs. The profile from the left image is in black, the profile from the right image is in red, and disparity lines are in blue. The average disparity is more than 200 pixels.

Figure 3:
FIG. 3 is a pictorial representation of a Tsukuba image dataset showing smaller disparity computations.
Figure 4:
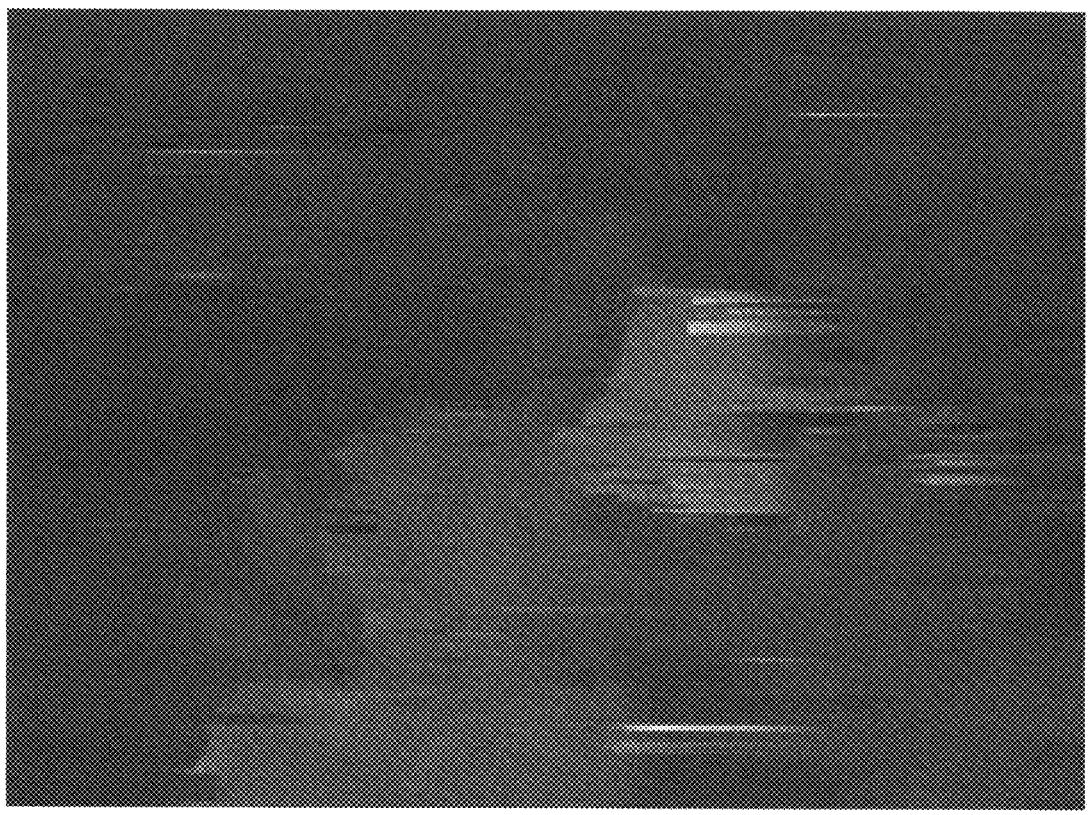
FIG. 4 is a pictorial representation of a Tsukuba image dataset showing larger disparity computations.

Two cases of the well-known Tsukuba image datasets are presented in FIGS. 3 and 4. In FIG. 3, the disparities are smaller whereas they are comparatively larger in FIG. 4. Clearly, the results are noisy when compared with other established methods. The results in FIGS. 3 and 4 must be seen in the context of the present invention. Both smoothness in the vertical and occlusions are not imposed or tracked at the algorithmic level during the matching process. Instead, they are expected to fall out as the result of the matching process. It is evident in areas where correct matches are found that there is smoothness in the vertical.

The results shown in FIGS. 2-4 support the fundamental premise of the present approach, based on the level set method, that disparities need to be computed only at the extremal pixels and that the disparities at in-between pixels can be filled-in from those at the extremal pixels. While this premise was also made by Marr and Poggio, Baker and Binford, and Ohta and Kanade at a conceptual level, they used pixel-based designs in their matching criteria. The method of the present invention that utilizes a feature front reduces the amount of data that needs to be processed. Moreover, the min-max SAD score is sufficient and robust for accurately and efficiently detecting correct matches. Obtaining smoothness in the vertical and finding occluded regions only as the result of the matching process are achievable within the context of the present invention.

Figure 5:
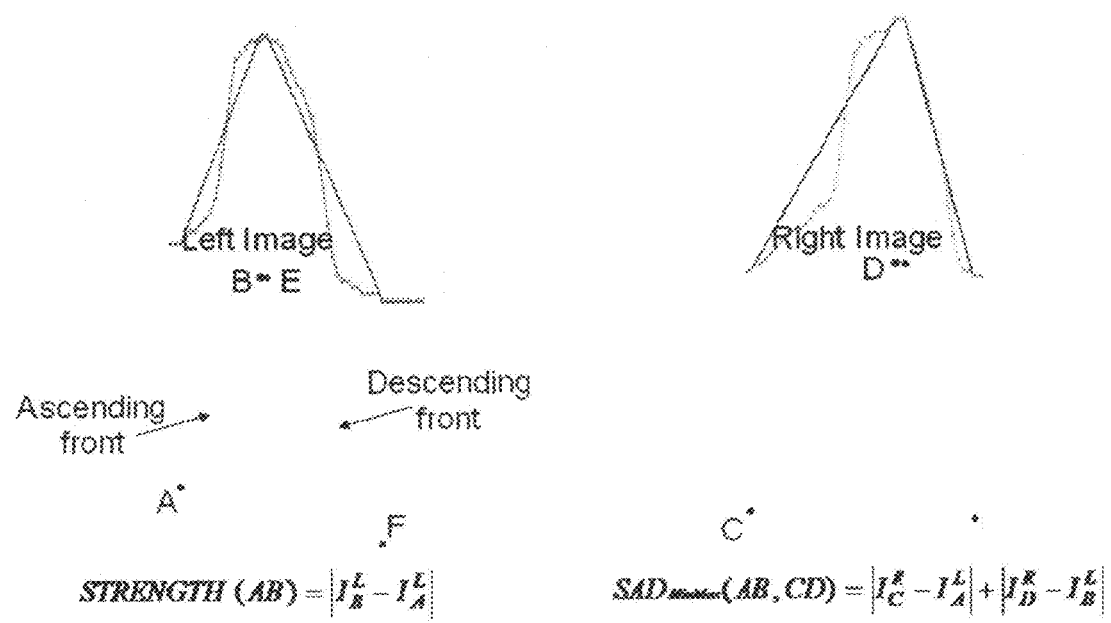
FIG. 5 is a graphical illustration of the min-max SAD for the present invention.

FIG. 5 shows the min-max SAD. The local extrema is first found as shown in the top two figures of FIG. 5. Then, feature fronts are constructed, such as AB and CD, by connecting extremal values by straight lines. The strength of a feature front is defined as the absolute difference between its end intensity values. The min-max SAD score is defined as the sum of the absolute differences of the extremal intensity values. The type of front AB is ascending and the type of front EF is descending. Therefore:

$$\text{STRENGTH}(AB)=|I_B^L-I_A^L|$$

and $$\text{SAD}_{MinMax}(AB,CD)=|I_C^R-I_A^L|+|I_D^R-I_B^L|$$

Figure 6:
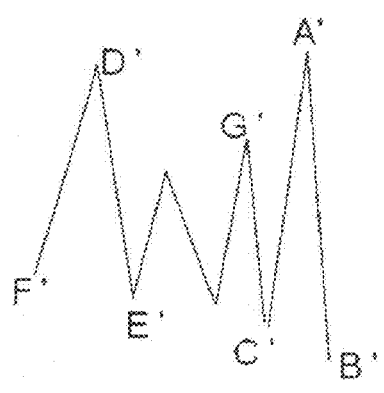
FIG. 6 is a graphical illustration of left and right image fronts for the present invention.
Figure 6:
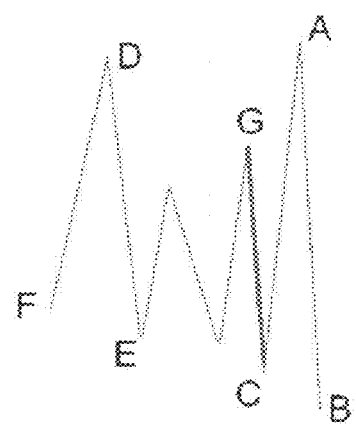

FIG. 6 shows a left image and a right image. Assume CG is the current front. CG is flanked by stronger fronts DE to the left and AC to the right. Therefore, the method of the present invention would have already found the corresponding fronts D'E' and A'C'. Thus, pixel E' is the left-limit and pixel C' is the right-limit. The search for a matching front for front CG is limited to the region between the left-limit and the right-limit.

The method and apparatus of the present invention providing feature-front based stereo matching image processing using min-max SAD can be summarized as follows, not necessarily in order of priority:

1. Obtain one image called left image and one image called right image. The images can be obtained:
   1. by two cameras located side-by-side with their optical axes parallel to each other,
   2. by a single camera moving parallel to the image plane along the scanline direction, or
   3. after rectifying a pair of images of a scene taken from arbitrary orientations, positions, and scales.

2. Convert the images to grey scale, if necessary. The following steps are described assuming grey scale images. The method and algorithm can be used in identical fashion for each channel of a color image.
3. Smooth the images to required levels (for example, three times with a 5-point Gaussian kernel). In the following, image could mean either raw image or smoothed image.
4. Start at the first scanline in each image and define it as the current scanline.
5. Along the current scanline, find the locations of the extrema of the image intensity field, see FIG. 5. These locations are called extremal pixels in the following. To find the extremal pixels, complete the following:
    1. At each pixel along the current scanline, find the product of the backward and forward differences of the image intensity field at that pixel.
    2. If the product is less than zero, then that pixel is an extremal pixel.
    3. If the product is equal to zero and one of the differences is non-zero, then that pixel is also an extremal pixel.
6. Define a feature front to be a line connecting two or more consecutive extremal image intensity values. In the following, feature front or simply front means two consecutive extremal intensity values connected by a straight line. The strength of a feature front is defined to be the absolute difference between its end intensity values. The type of a feature front is defined as ascending or descending, see FIG. 5. In an ascending feature front the minimum-end would be to the left of its maximum-end.
7. Considering both the left and right scanlines simultaneously, sort the feature fronts in decreasing order of their strengths. To account for quantization errors, skip matching fronts having strengths smaller than 2.
8. Match feature fronts between the left and right scanlines based on the sorted order. That is, match the strongest feature front first and the weakest the last. The feature front for which a match is being sought is called the current feature front. The region on the other scanline over which a match is sought is defined as the search window. The search window has a left-limit and a right-limit.
9. Assume the current feature front is on the left scanline. Then, in order to find an initial match on the right scanline:
    9.1 Find the second nearest front to the right of the current front on the left scanline for which an initial right match has been already found and note the location of this right front, which is called right-limit in the following. See FIG. 6. If no such front exists, then the right-limit is the end of the right scanline.
    9.2 Note the extremal interval on the right scanline in which the current front on the left scanline falls. The right end of this interval is called the left-limit in the following. See FIG. 6.
    9.3 For each front on the right scanline between the left-limit and the right-limit, of the same type as the current front, compute the sum of the absolute differences (SAD) between the end intensity values of this front with the current front on the left scanline. This two-point SAD score is called the min-max SAD score in the following. See FIG. 5. The tentative right match is defined as that right front that minimizes the min-max SAD score.
    9.4 For the tentative right-match found in Step 9.3, search the left scanline for its tentative left-match after similarly defining limits for the search process as in Steps 9.1 and 9.2.
    9.5 If the tentative left-match is the same as the current front, then accept the tentative-right match as the initial right match for the current front.
    9.6 Otherwise, reject the match and go to Step 11.
10. If the current feature front is on the right scanline, follow an identical procedure as in Step 9 and either find a initial left match or reject any tentative match and go to Step 11.
11. Choose the next unmatched strongest front as the current front.
12. If the strength of the current front is greater than 1 and the current front is on the left scanline, go to Step 9. Otherwise, go to Step 14.
13. If the strength of the current front is greater than 1 and the current front is on the right scanline, go to Step 10. Otherwise, go to Step 14.
14. At this point both left-to-right correspondences and right-to-left correspondences would have been either found or marked as rejected for all fronts whose strength is greater than 1. These correspondences are called initial because the order criterion may still be violated at some locations.
15. Consider the right scanline and travel this line from right to left visiting each extremal pixel. Call the currently visited pixel with a valid correspondence as the current pixel. For the current pixel:
    15.1 Locate its corresponding pixel on the left scanline.
    15.2 Locate the interval on the right scanline where the corresponding left scanline pixel falls. Mark the upper end of this interval as the left-limit.
    15.3 Between the current pixel and the left-limit, check for the extremal pixels for which valid correspondences have been found, whether their disparity is smaller than that of the current pixel.
    15.4 If the check in Step 15.3 is true, then the order criterion is violated. Then, re-compute the correspondence at the current pixel shown in Step 10. Since the limits have changed, this will result in a better correspondence for the current pixel.
16. Perform an identical procedure to Step 15 for the left scanline.
17. At this point, valid correspondences would have been found for extremal pixels visible in both scanlines.
18. Consider the left-to-right correspondence. Consider two consecutive extremal pixels with valid correspondences on the left scanline. Use interpolation to fill in the correspondences at every in-between pixel.
19. Repeat Step 18 for right-to-left correspondence, if necessary.
20. Increment the current scanline by 1.
21. Repeat Steps 5-20 until the last scanline has been processed.
22. At this stage, one would have computed a dense disparity field. Display the dense disparity result on a monitor, or store it in a file for further examination and/or processing, print it for viewing and interpreting, or send it for further processing by other functional units in the system.

CONCLUSION

The invention provides a new method, system, and apparatus for computer vision technology. The novel utilization in the invention of a feature front was inspired by the observation, based on the level set method, that useful information for disparity computations is resident only at the extrema of the image intensity field. This same observation also led to the use of the min-max SAD score in the present invention. The use of feature front led to the novel use of ordering the scanline based on the feature strengths and to an alternate algorithm for finding matches and imposing left-right consistency checks and uniqueness checks in a tightly-coupled manner.

Potential extensions of the present invention include applications involving dense computation of optical flows and video understanding and content-based retrieval.

The present invention has for the first time described and fully characterized a method and system for stereo vision matching using feature front utilization and the mm-max sum of the absolute intensity differences (SAD). The above detailed description is presented to enable any person skilled in the art to make and use the invention. Specific details have been disclosed to provide a comprehensive understanding of the present invention and are used for explanation of the information provided. These specific details, however, are not required to practice the invention, as is apparent to one of ordinary skill in the art. Descriptions of specific applications are meant to serve only as representative examples. Various suitable changes, modifications, combinations, and equivalents to the preferred embodiments may be readily apparent to one skilled in the art and the general principles defined herein may be applicable to other embodiments and applications while still remaining within the spirit and scope of the invention. The claims and specification should not be construed to unduly narrow the complete scope of protection to which the present invention is entitled. It should also be understood that the figures are presented for example purposes only. No intention exists for the present invention to be limited to the embodiments shown and the invention is to be accorded the widest possible scope consistent with the principles and features disclosed herein.

What is claimed is:

1. A method for feature-front based stereo matching image processing utilizing a computer-based device, the method comprising:
   providing at least one left image having at least one scanline and at least one right image having at least one scanline of an object or scene, wherein each scanline has at least one extremal pixel;
   optionally converting the left image and right image to grey scale images;
   optionally smoothing the left and right image;
   finding the extremal pixels along each scanline in each image by calculating at each pixel the product of the along-the-scanline backward and forward differences of the image intensity field,
   whereby a pixel is an extremal pixel when the product is less than zero or when the product is zero and either the backward or forward difference is non-zero and
   wherein two consecutive image intensity extrema are connected by a straight line to form an ascending or descending feature front, for the left image and for the right image, having a strength equal to the absolute difference between the feature front end intensity values;
   utilizing the scanlines from the left image and right image simultaneously and sorting the feature fronts in decreasing order of strengths greater than a value of zero into a list; and
   calculating for each front in the sorted list, in order of strongest to weakest feature front regardless of scanline, the matching front on the other scanline within a search window satisfying the match criterion, wherein the feature front for which a match is sought is the current feature front.

2. The method of claim 1, wherein the at least one left image and right image are from two cameras having parallel optical axes.

3. The method of claim 1, wherein the at least one left image and right image are from one camera moving parallel to the image plane along the scanline.

4. The method of claim 1, wherein the images are color images.

5. The method of claim 1, wherein the images are raw images.

6. The method of claim 1, wherein the images are smoothed images.

7. The method of claim 1, further comprising finding an initial match on the right image scanline, for the current feature front on the left image scanline, comprising the steps of:
   finding the right-limit of the search window as the second nearest front to the right of the current feature front on the left image scanline for which an initial right match was found;
   finding the left-limit of the search window as the right end of the extremal interval on the right image scanline in which the current feature front on the left image scanline falls, wherein an extremal interval comprises of all the pixels between consecutive extrema;
   computing the sum of the absolute differences between: the end intensity values of the front on the right image scanline within the search window, of the same type as the current feature front, wherein the type is either ascending or descending, and the current feature front on the left scanline, wherein the tentative right match is the right front minimizing the sum;
   similarly searching the left image scanline for a tentative left match of the tentative right match;
   accepting the tentative right match as the initial right match for the current feature front when the tentative left match is the same as the current feature front; and
   rejecting the tentative right match if the tentative left match is not the same as the current feature front and choosing the next available unmatched and strongest front as the current feature front.

8. The method of claim 1, further comprising finding an initial match on the left image scanline, for the current feature front on the right image scanline, comprising the steps of:
   finding the left-limit of the search window as the second nearest front to the left of the current feature front on the right image scanline for which an initial left match was found;
   finding the right-limit of the search window as the left end of the extremal interval on the left image scanline in which the current feature front on the right image scanline falls;
   computing the sum of the absolute differences between: the end intensity values of the front on the left image scanline within the search window, of the same type as the current feature front, wherein the type is either ascending or descending, and the current feature front on the right scanline, wherein the tentative left match is the left front minimizing the sum;
   similarly searching the right image scanline for a tentative right match of the tentative left match;

accepting the tentative left match as the initial left match for the current feature front when the tentative right match is the same as the current feature front; and rejecting the tentative left match if the tentative right match is not the same as the current feature front and choosing the next available unmatched and strongest front as the current feature front.

9. The method of claim 7, wherein finding an initial match on the right image scanline continues until the value of the strength of the current feature front is equal to or less than one.

10. The method of claim 8, wherein finding an initial match on the left image scanline continues until the value of the strength of the current feature front is equal to or less than one.

11. The method of claim 1, further comprising finding final matches on the right image scanline, for the feature fronts on the left image scanline, comprising the steps of:

considering each feature front on the left scanline with a valid initial match in order from left to right, wherein the currently considered feature front is the current front;

finding the right-limit on the left scanline as the right end of the extremal interval on the left scanline where the right end of the initial matching front of the current front on the right scanline falls;

searching between the right end of the current front and the right limit for a front with a valid match such that the right end of its matched front is located to the left of the right end of the initial matched front of the current front;

recalculating the match for the current front according to the method of claim 7, if the search succeeds; and accepting the initial match as the final match if the search fails.

12. The method of claim 1, further comprising finding final matches on the left image scanline, for the feature fronts on the right image scanline, comprising the steps of:

considering each feature front on the right scanline with a valid initial match in order from left to right, wherein the currently considered feature front is the current front;

finding the left-limit on the right scanline as the left end of the extremal interval on the right scanline where the left end of the initial matching front of the current front on the left scanline falls;

searching between the left end of the current front and the left limit for a front with a valid match such that the left end of its matched front is located to the right of the left end of the initial matched front of the current front;

recalculating the match for the current front according to the method of claim 8, if the search succeeds; and accepting the initial match as the final match if the search fails.

13. The method of claim 11 or 12 wherein the fronts are considered based on their combined strength sorted order.

14. The method of claim 11, further comprising finding two consecutive extremal pixels having valid final matches on the left scanline and interpolating to fill in matches at each in-between pixel.

15. The method of claim 12, further comprising finding two consecutive extremal pixels having valid final matches on the right scanline and interpolating to fill in matches at each in-between pixel.

16. The method of claim 1, further comprising analyzing each scanline of the left image and of the right image for finding valid correspondences for extremal pixels and computing a dense disparity field by interpolating at in-between pixels for computer-based display, storage, or further processing.

17. An apparatus for feature-front based stereo matching image processing comprising:

one or more cameras providing at least one left image having at least one scanline and at least one right image having at least one scanline of an object or scene, wherein each scanline has at least one extremal pixel; and a computer-based device performing the steps of:

optionally converting the left image and right image to grey scale images;

optionally smoothing the left and right image;

finding the extremal pixels along each scanline in each image by calculating at each pixel the product of the along-the-scanline backward and forward differences of the image intensity field, whereby a pixel is an extremal pixel when the product is less than zero or when the product is zero and either the backward or forward difference is non-zero and wherein two consecutive image intensity extrema are connected by a straight line to form an ascending or descending feature front, for the left image and for the right image, having a strength equal to the absolute difference between the feature front end intensity values;

utilizing the scanlines from the left image and right image simultaneously and sorting the feature fronts in decreasing order of strengths greater than a value of zero into a list; and calculating for each front in the sorted list, in order of strongest to weakest feature front regardless of scanline, the matching front on the other scanline within a search window satisfying the match criterion, wherein the feature front for which a match is sought is the current feature front.

18. An apparatus for feature-front based stereo matching image processing as defined in claim 17, wherein the at least one left image and right image are from two cameras having parallel optical axes or from one camera moving parallel to the image plane along the scanline.

19. An apparatus as defined in claim 17, further comprising a means for finding an initial match on the right image scanline, for the current feature front on the left image scanline.

20. An apparatus as defined in claim 17, further comprising a means for finding an initial match on the left image scanline, for the current feature front on the right image scanline.

21. An apparatus as defined in claim 19, wherein the means for finding an initial match on the right image scanline continues until the value of the strength of the current feature front is equal to or less than one.

22. An apparatus as defined in claim 20, wherein the means for finding an initial match on the left image scanline continues until the value of the strength of the current feature front is equal to or less than one.

23. An apparatus as defined in claim 17, further comprising a means for finding final matches on the right image scanline, for the feature fronts on the left image scanline.

24. An apparatus as defined in claim 17, further comprising a means for finding final matches on the left image scanline, for the feature fronts on the right image scanline.

25. An apparatus as defined in claim 23 or 24, wherein the fronts are considered based on their combined strength sorted order.

26. An apparatus as defined in claim 23, further comprising a means for finding two consecutive extremal pixels having valid final matches on the left scanline and interpolating to fill in matches at each in-between pixel.

27. An apparatus as defined in claim 24, further comprising a means for finding two consecutive extremal pixels having valid final matches on the right scanline and interpolating to fill in matches at each in-between pixel.

28. An apparatus as defined in claim 17, further comprising a means for analyzing each scanline of the left image and of the right image for finding valid correspondences for extremal pixels and a means for computing a dense disparity field by interpolating at in-between pixels for computer-based display, storage, or further processing.

29. An apparatus as defined in claim 17, wherein the images are color images.

30. An apparatus as defined in claim 17, wherein the images are raw images.

31. An apparatus as defined in claim 17, wherein the images are smoothed images.

* * * * *